United States Patent
Brown et al.

(10) Patent No.: US 6,498,805 B1
(45) Date of Patent: Dec. 24, 2002

(54) APPARATUS AND METHOD FOR ESTIMATING CHANNEL PHASE USING CHANNEL SYMBOL RELIABILITY DATA

(75) Inventors: Tyler Brown, Mundelein, IL (US); Michael Mao Wang, Carpentersville, IL (US); Fuyun Ling, San Diego, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/433,814

(22) Filed: Nov. 3, 1999

(51) Int. Cl.[7] .............................. H04B 1/69; H04L 27/06
(52) U.S. Cl. ................................. 375/147; 375/316
(58) Field of Search ....................... 375/147, 228, 375/346, 348, 316, 130; 370/342, 320, 335

(56) References Cited

U.S. PATENT DOCUMENTS

| | | | |
|---|---|---|---|
| 5,790,596 A | 8/1998 | Sexton | 375/228 |
| 5,809,083 A * | 9/1998 | Wright | 375/285 |
| 5,875,215 A * | 2/1999 | Dobrica | 375/231 |
| 6,222,498 B1 * | 4/2001 | Ishii et al. | 343/853 |

* cited by examiner

*Primary Examiner*—Chi Pham
*Assistant Examiner*—Khai Tran
(74) *Attorney, Agent, or Firm*—Steven A. May

(57) ABSTRACT

An apparatus and method provides channel phase compensation for a digital radio frequency RF channel, by analyzing a demodulated signal (24) communicated over the digital RF channel and generates data representing an estimate of a channel phase (28), based on channel symbol reliability data (242) generated for at least one channel symbol received over the RF channel. The apparatus and method iteratively generates channel symbol reliability data (242) for a same symbol until a frame containing the symbol is determined to either pass a frame error threshold or until a predetermined number of iterations of channel phase estimates for a symbol is detected.

29 Claims, 3 Drawing Sheets

APPARATUS AND METHOD FOR ESTIMATING CHANNEL PHASE USING CHANNEL SYMBOL RELIABILITY DATA

FIELD Of THE INVENTION

The invention relates generally to wireless communication systems, and more particularly to an apparatus and method for estimating a channel phase in a digital radio frequency communication system.

BACKGROUND OF THE INVENTION

In a typical wireless communication system such as a digital radiotelephone system, a base station having a controller and a plurality of transmitters and receivers communicates with mobile stations operating within an area served by the base station. Multiple access wireless communication between the base station and the mobile stations occurs via radio frequency (RF) channels which provide physical paths over which digital communication signals, such as voice, data and video are transmitted. Base-to-mobile station communications are said to occur on a forward-link channel, while mobile-to-base station communications are referred to as being on a reverse-link channel. Well known RF digital channelization techniques include, for example, time division multiple access (TDMA) and code division multiple access (CDMA) and other channelization techniques. Communication systems using frame based CDMA channelization are described, for example, in TIA/EIA Standard IS-95.

Transmitting a communication signal over an RF channel through a medium such as air causes a received communication signal to significantly differ from an originally transmitted communication signal. A transmitting communication signal may be altered during transmission over a channel resulting in channel gain and channel phase shifts. In addition, additional noise may be introduced.

A quality of recovery of transmitted communication signals from the received signal may be enhanced by accurately estimating channel parameters such as channel phase and other parameters. Pilot signals have been implemented to allow a determination of channel phase. Symbols communicated over a pilot channel typically communicated with symbols of the signal of interest and received over the same antenna under a different code (in a CDMA system, for example).

In spread spectrum systems, for example, such as CDMA systems, there is a need for channel phase compensation due to channel phase shifts due to propagation of information through the channel. A polarity of symbols can be affected by channel phase. As such, coherent receivers, those which receive information as conveyed by polarity of the transmitted symbols, may incorporate some type of channel phase compensation.

One known radiotelephone receiver having channel phase compensation, is disclosed in U.S. Pat. No. 5,790,596, issued on Aug. 4, 1998, entitled "Radiotelephone Communication Unit Displaying Chronological Information," having inventor Thomas A, Sexton, and assigned to instant assignee. Although such a receiver has many advantages, such receivers generally attempt channel phase estimation for slowly changing channels, but not typically for channel parameters that can change throughout a frame. In addition, typical phase compensation techniques are used which provide for reencoding of future symbols based on some type of channel phase estimate of previous symbols. However, such systems may not adequately provide channel phase estimations and allow reprocessing of the same symbols within a frame based on the estimated channel phase shifts.

Consequently, there exists a need for a receiver and method that facilitates improved channel phase shift estimation and can allow reprocessing of symbols in the same frame that have previously been corrected for channel phase shifts.

DETAILED DESCRIPTION OF THE PREFERRED EMBODIMENT

Briefly, an apparatus and method for providing channel phase compensation for a digital radio frequency RF channel, analyzes a demodulated signal communicated over the digital RF channel and generates data representing an estimate of a channel phase, based on channel symbol reliability data generated for at least one channel symbol received over the RF channel. The apparatus and method iteratively generates channel symbol reliability data for a same symbol until a frame containing the symbol is determined to either pass a frame error threshold or until a predetermined number of iterations of channel phase estimates for a symbol is detected.

In one embodiment, a channel phase estimator generates data representing channel symbol reliability data to determine estimated channel phase data on a per symbol basis. A demodulator, responsive to the estimated channel phase data, demodulates a received phase modulated signal in a fashion that accounts for the estimated channel phase that has been determined based on the channel symbol reliability data.

For example, in one embodiment baseband data is demodulated with the channel estimate obtained by filtering a pilot signal. The resulting metrics are fed to a decoder which generates estimates of the information and channel symbol sequences. The estimate of the channel symbols is weighted according to the estimate's reliability. The estimated information sequence is checked by a frame detector to determine if the frame is in error. If a frame error has occurred the reliability-weighted channel symbol estimates are multiplied by the sequence of received baseband symbols. The result is a sequence of channel phase estimates which are scaled in proportion to the reliability of the estimated symbols used to "unwrap" the data modulation. The apparatus and method includes filtering the resulting sequence in a manner similar to the pilot signal and uses the result as another reference phase for another iteration of the modulation. The resulting metrics are then fed back to the decoder and the process is repeated until either the frame is decoded without error or until the maximum number of iterations is reached.

Figure 1:
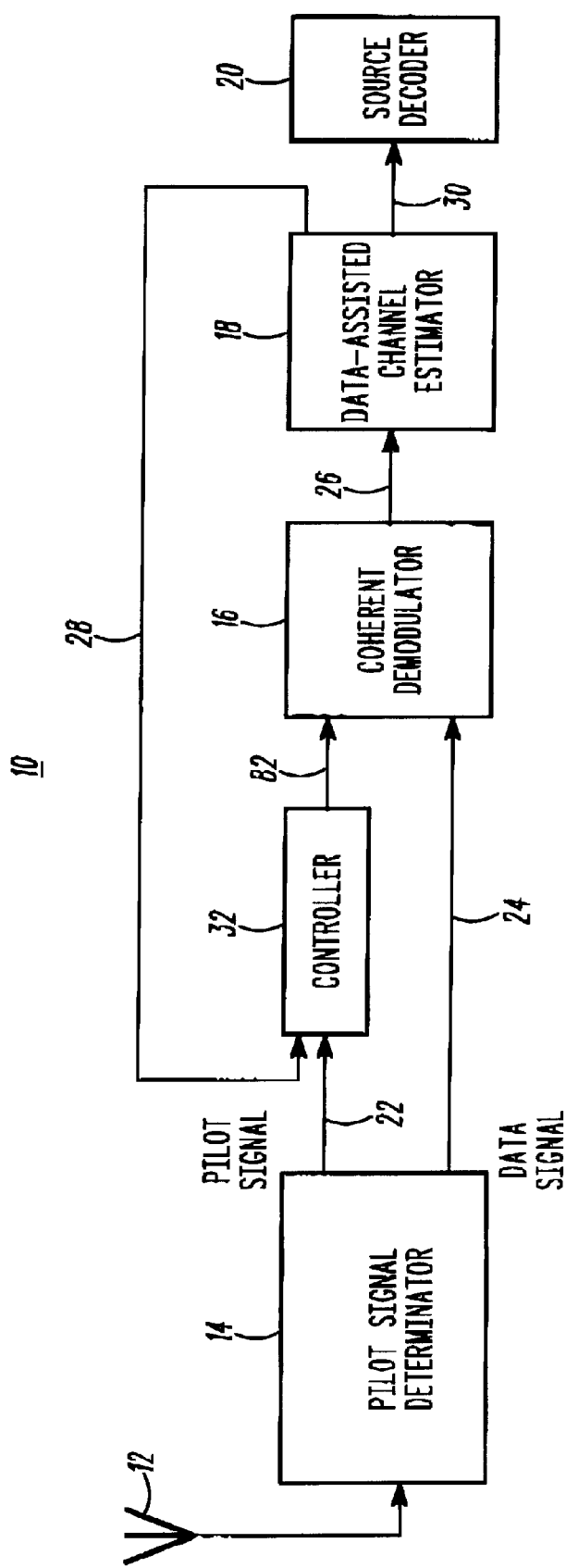
FIG. 1 is a block diagram illustrating an example of one embodiment of the invention.

Turning to the drawings, wherein like numerals designate like components, FIG. 1 is a block diagram illustrating one example of a receiver 10 that receives phase modulated signals 12 that have been communicated over a radio frequency channel. For purposes of illustration. the received phase modulated signal will be assumed to be a CDMA based signal. However, it will be recognized that any suitable channelization technique may also benefit from the disclosed apparatus and methods. In this example, the receiver 10 includes a pilot signal determinator 14, a controller 32, a demodulator 16, a data-assisted channel phase estimator 18 and a source information decoder 20. The pilot signal determinator 14 determines, for example, which symbols are from the pilot signal and which symbols correspond with the signal of interest. The pilot signal determinator outputs a pilot signal 22 and a data signal 24. The controller 32, determines whether the despread pilot signal 22 or the data-assisted channel estimate 28 is fed to the demodulator. The coherent demodulator 16 receives the despread pilot signal 22 and the despread data signal 24. The demodulator outputs demodulated symbols 26 that are received by the data-assisted channel phase estimator 18. The channel phase estimator 18 uses channel symbol reliability data to perform channel phase estimation as further described below. The data-assisted channel phase estimator 18 generates reliability data based channel phase estimate data 28 which is fed back to the controller 32. When a frame has passed error detection or if a suitable number of iterations have occurred, the estimator outputs the estimation of the information sequence 30 to the source information decoder 20 which then suitably decodes the information for use by a next stage of the system. The demodulator 16 demodulates a received phase modulated signal on a per symbol, or group of symbols, basis in a fashion that accounts for channel symbol reliability based channel phase estimation.

Figure 2:
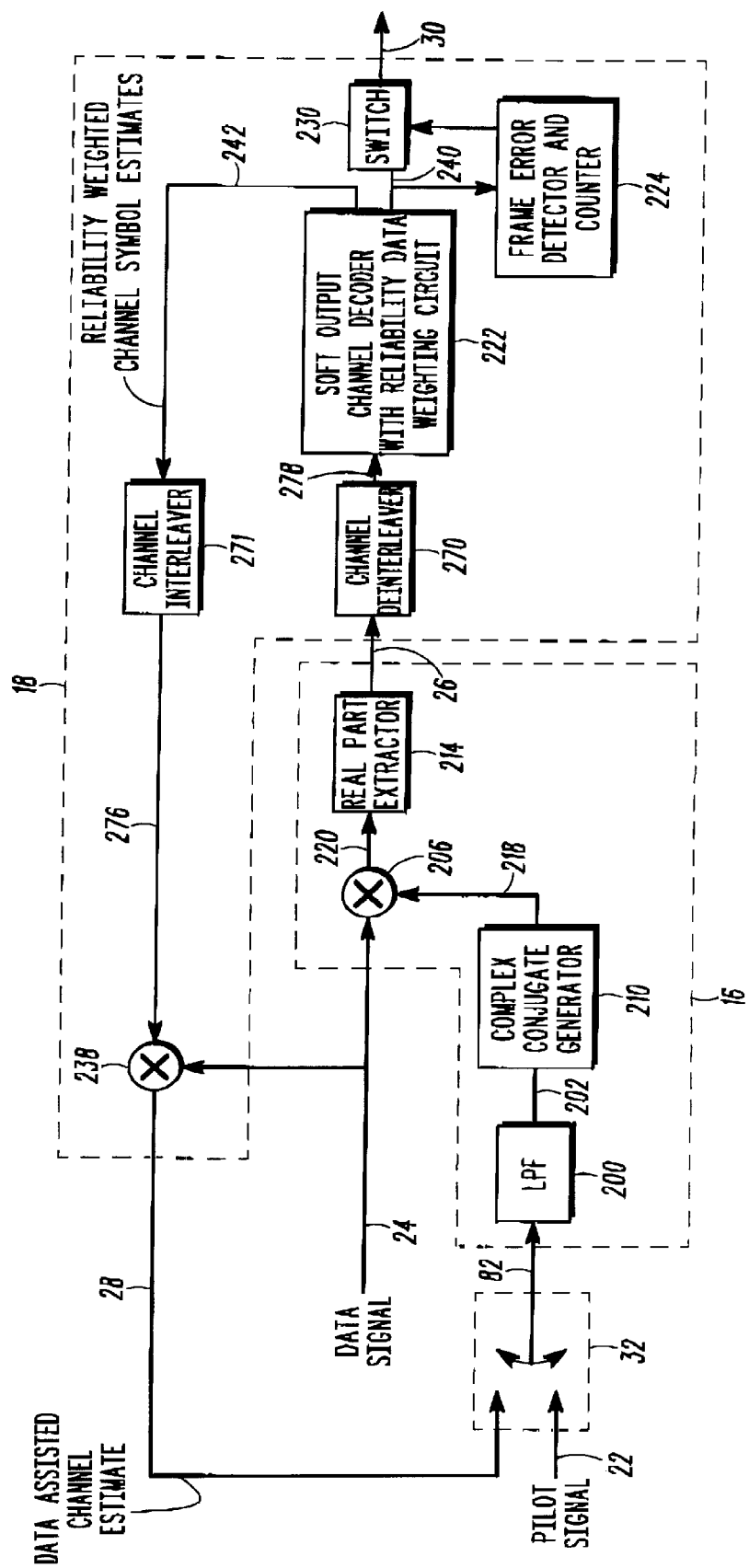
FIG. 2 is a more detailed block diagram illustrating the example of one embodiment of the invention shown in FIG. 1.

FIG. 2 shows one example of the data assisted channel phase estimator 18 operatively responsive to demodulated pilot signal symbols 22 and demodulated data symbols 24 received by an antenna. In this embodiment the controller 32 first selects the despread pilot signal 22 which is then passed through a low pass filter 200 with the filtered pilot signal 202 being passed through a complex conjugate generator 210. The complex conjugate generator 210 outputs conjugate channel phase estimates from the pilot signal indicated as 218. A channel phase estimate from the pilot signal 218 is multiplied by multiplier 206 with received data symbols 24 resulting in pilot phase compensated symbols 220 (in the first pass). In passes using reliability data, the phase compensated symbols become reliability data based phase compensated symbols in subsequent passes. The multiplier multiplies on a symbol by symbol basis. The real part extractor 214 extracts the real part of the resulting pilot phase compensated symbols. These components may be conventional real part extractors, low pass filters, multipliers and complex conjugate generators as known in the art. It will also be recognized that these components may be implemented in hardware, software, firmware, or any other suitable combination thereof as desired. These demodulated symbols 26 are then de-interleaved by channel de-interleaver 270. The channel de-interleaver 270 restores the demodulated symbols 26 to their original order. The resulting sequence 278 is then decoded by a soft output channel decoder 222. The real part extractor 214 removes the real part of the result to remove noise in the quadrature part, as known in the art.

The data-assisted channel phase estimator 18, in addition to the soft output channel decoder 222 and the channel de-interleaver 270, includes a frame error detector 224, a switch, 230, a channel interleaver 271 and multiplier 238. It will be recognized that the functions of these blocks may be suitably combined or be separated in a different manner than shown.

The soft output channel decoder 222 iteratively generates data representing an estimate of an information sequence 240 and reliability-weighted channel symbol estimates 242. One embodiment of the soft output channel decoder uses a maximum a posteriori (MAP) probability algorithm, such as may be found in Bahl L. R., Cocke J., Jeinek F., and Raviv J., "Optimal Decoding of Linear Codes for Minimizing Symbol Error Rate," Trans. Inform, Theory, vol. IT-20, March 1974, pp. 248–287 to first calculate the likelihood ratios of the channel symbol estimates which range from $-\infty$ to $+\infty$. To obtain the best estimates of the channel symbols from the log-likelihood ratio of the channel symbol estimates, the log-likelihood ratios of the channel symbol estimates, $\lambda$, are fed through a weighting circuit which outputs the hyperbolic tangent of its input, $\eta$:

$$\eta = \frac{e^\lambda - e^{-\lambda}}{e^\lambda + e^{-\lambda}}$$

which ranges from -1 to +1. Given the prior probabilities of the channel symbols given by the likelihood ratio, this weighting minimizes the mean-squared-error of the difference between the weighting circuit's output and the actual channel symbol value. However, it will be recognized that other suitable algorithms to generate reliability-weighted channel symbol data may also be used. For example, a soft output Viterbi algorithm (SOVA) can be used. In addition, the reliability-weighted channel symbol estimates can be compared to a reliability threshold. If the reliability weighted channel symbol estimates is less than a threshold, the sign of the channel symbol is inverted.

One example of reliability data is the log-likelihood ratio in which case the range of values of the reliability-weighted channel symbol data can be from $-\infty$ to $+\infty$. The data-assisted channel phase estimator 18 iteratively generates reliability-weighted channel symbol data 242, until the frame has been decoded correctly as determined by the frame error detector 224 or until a predetermined number of iterations of channel phase estimates for the frame is detected. The reliability-weighted channel symbol data 242 is interleaved by the channel interleaver 271 as known in the art. The controller 32 controls whether channel phase estimates 22 or 28 is selected as output 82 which is then fed to the demodulator 16.

The multiplier circuit 238 is operatively coupled to receive the despread data 24 and to receive the re-interleaved channel symbols 276 based on the reliability-weighted channel symbol data 242. The multiplier circuit 238 outputs channel phase estimate data, such as data-assisted channel phase estimates 28 that is based on the data symbols 24. Accordingly, the data-assisted channel phase estimates 28 are estimated channel phase data that are based on the reliability-weighted channel symbol data 242. The controller 32 now switches the input to the demodulator 16 from pilot signal 22 to data-assisted channel estimates 28. Similar to the procedure where the pilot signal is used, the data-assisted estimates 28 are filtered through the low pass filter 212, passed through complex conjugate generator 210, and multiplied by the data signal 24 to obtain the demodulated symbols 26. The resulting metrics are then fed back to the soft output channel decoder 222 and the process is repeated until either the frame is decoded without error or the maximum number of iterations is reached.

Figure 3:
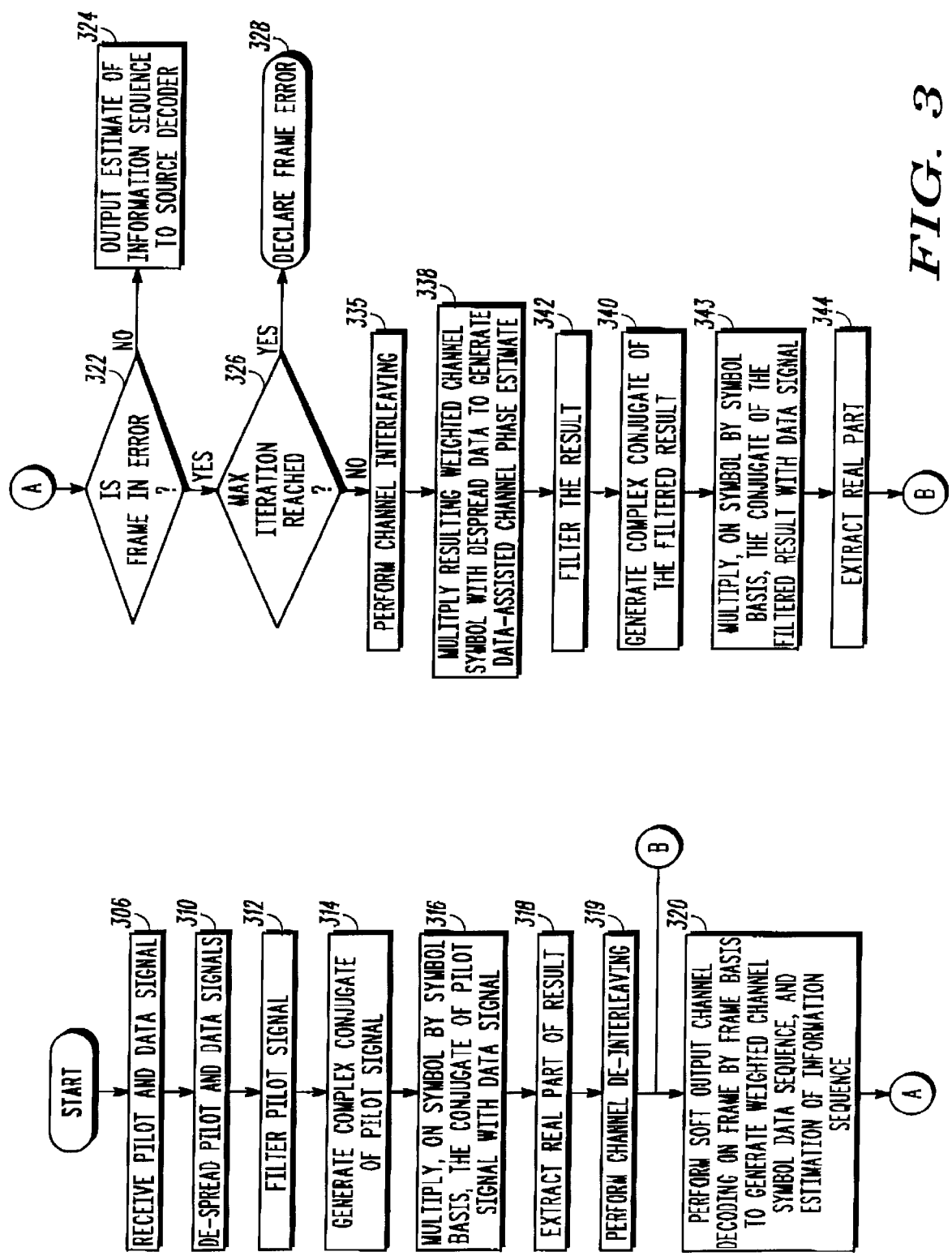
FIG. 3 illustrates a flow chart representing one example of the operation of the system shown in FIG. 2.

FIG. 3 illustrates one example of the operation of the circuit of FIG. 2. As shown in block 306, the antenna and demodulator receive the pilot signal and data signal. As shown in block 310, the process includes, where the received signal is a spread spectrum signal, despreading the pilot signal and despreading the data signal using conventional despreaders.

As shown in block 312, the despread pilot signal is filtered. As shown in block 314, the process includes generating the complex conjugate of the pilot signal, and as shown in block 316, multiplying, on a symbol by symbol basis, the complex conjugate of the de-spread pilot signal with the despread data signal to obtain the pilot phase compensated symbols 220. As shown in block 318, the process includes extracting the real part of the result to remove, for example, noise in the quadrature part of the signal. As shown in block 320, the process includes performing soft output channel decoding on a frame by frame basis to generate the reliability-weighted channel symbol estimates 242 and the estimates of information sequence 240. In block 322 the frame error detector 224 determines if a frame error has occurred. If no frame error has occurred, the estimate of the information sequence is output through the switch 230 to the source decoder as shown in block 324. However, as shown in block 326, if a frame error has occurred, the process includes determining if the predetermined maximum iteration of soft decoding has been reached. If the maximum iteration of soft decoding has been reached and if a frame error has occurred, the process includes declaring that a frame error has resulted as shown in block 328.

However, if the maximum iteration of the soft decoding has not been reached, the process continues to block 335. The data assisted channel phase is generated by multiplying the interleaved reliability-weighted channel symbol data values with the data signal to obtain the data assisted channel estimate 28 as shown in block 338. As shown in block 340, the process includes filtering the data-assisted channel estimate in block 342 and generating the complex conjugate of the filtered data-assisted channel estimate 202. This signal is then multiplied on a symbol by symbol basis with the data signal 24 to give the phase corrected data signal 24. As shown in block 344, the process continues by extracting the real part of the result to remove noise in the quadrature part of the signal. The process includes passing the real part to the soft output channel decoder and then performing the soft output channel decoding on a symbol by symbol and frame by frame basis to iteratively generate reliability-weighted channel symbol data and an estimate of an information sequence until no frame error is detected, or until the number of predetermined soft output channel decoding iterations has been detected.

Accordingly, the apparatus and method provides a mechanism that, among other things, reprocesses symbols in the same frame when the symbols have previously been corrected for channel phase shifts using reliability-weighted channel symbol estimates. The channel phase estimates are first derived from the pilot signal (the frame is decoded once), and the data from the soft output channel decoding is then used to assist in determining subsequent channel phase estimates, if the frame is in error. Accordingly, the disclosed receiver and methods can accommodate channel phase estimation for channel parameters that can change throughout a frame. The receiver generates data representing an estimate of the channel phase by iteratively generating the reliability-weighted channel symbol estimates for a same channel symbol until a frame containing the symbol is determined to pass a frame error threshold or until a predetermined number of iterations of soft output channel decoding iteration has been detected. The receiver and method iteratively generates reliability-weighted channel symbol estimates if iteration is required. As such, the receiver and method reprocesses symbols from the same frame that has been corrected for channel phase shifts, based on reliability-weighted channel symbol estimates using additional or iterative channel phase estimations based on updated reliability-weighted channel symbol. Also, the disclosed apparatus and methods may find used as part of, by way of example and not limitation, WCDMA forward and reverse links, IS-95A, B and C forward link and IS-95C reverse links, non-CDMA systems or any other suitable wireless or RF system.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for providing channel phase correction for a digital radio frequency (RF) channel comprising the steps of:
    (a) analyzing a demodulated signal communicated over the digital RF channel; and
    (b) generating data representing an estimate of a channel phase based on a data-assisted channel estimate, wherein the data-assisted channel estimate is derived from reliability-weighted channel symbol estimates generated for at least one channel symbol of a signal of interest received over the RF channel.

2. The method of claim 1 wherein the step of generating data representing an estimate of a channel phase includes iteratively generating reliability-weighted channel symbol estimates for a same channel symbol until at least one of: a frame containing the same channel symbol is determined to pass a frame error threshold and until a predetermined number of iterations of channel phase estimates for a symbol is detected.

3. The method of claim 1 including the steps of:
    receiving a pilot signal containing data representing pilot symbols communicated over the RF channel; and
    generating, data representing an estimate of an information sequence and data representing a corresponding estimate of a sequence of coded symbols.

4. The method of claim 1 including the step of generating the reliability-weighted channel symbol estimates.

5. The method of claim 1 wherein step (b) includes using a maximum a posteriori probability algorithm to generate at least the reliability-weighted channel symbol estimates.

6. The method of claim 1 including the step of determining whether a frame error occurred with received symbols, prior to outputting a decoded frame.

7. The method of claim 3 wherein the digital RF channel communicates symbols as frames in a spread spectrum fashion and wherein the step (a) includes de-spreading a received pilot signal and de-spreading a data signal to obtain at least one channel symbol.

8. The method of claim 1 wherein the step of generating data representing an estimate of channel phase includes iteratively generating reliability-weighted channel symbol estimates on a per symbol basis.

9. The method of claim 1 including the step of reprocessing symbols from a same frame that has been processed based on reliability-weighted channel symbol estimates using additional channel phase estimation based on updated reliability-weighted channel symbol estimates.

10. A method for providing channel phase correction for a digital radio frequency (RF) channel comprising the steps of:
    (a) receiving a pilot signal and a data signal containing data representing pilot symbols communicated over the RF channel;

(b) analyzing a demodulated data signal communicated over the digital RF channel; and (c) iteratively generating an estimate of an information sequence and a data-assisted channel estimate, wherein the data-assisted channel estimate is derived from reliability-weighted channel symbol estimates generated for at least one channel symbol of a signal of interest received over the RF channel, to determine an estimate of a channel phase.

11. The method of claim 10 including the step of iteratively generating the reliability-weighted channel symbol estimates for a same channel symbol until a frame containing the same channel symbol is determined to pass a frame error threshold or until a predetermined number of iterations of channel phase estimates is detected.

12. The method of claim 10 wherein step (c) includes using a maximum a posteriori probability algorithm to generate at least the reliability-weighted channel symbol estimates.

13. The method of claim 10 including the step of determining whether a frame error occurred with received symbols, prior to outputting a decoded frame.

14. The method of claim 12 wherein the digital RF channel communicates symbols as frames in a spread spectrum fashion and including the step of de-spreading the received pilot signal and de-spreading the data signal to obtain at least one channel symbol.

15. The method of claim 10 wherein step (c) includes iteratively generating the reliability-weighted channel symbol estimates on a per symbol basis.

16. The method of claim 10 including the step of reprocessing symbols from a same frame that has been processed based on reliability-weighted channel symbol ry estimates using additional channel phase estimation based on updated reliability-weighted channel symbol estimates.

17. The method of claim 10 wherein the digital RF channel communicates symbols as frames in a spread spectrum fashion and wherein the step (a) includes de-spreading the received pilot signal and de-spreading the data signal to obtain the at least one channel symbol.

18. A receiver for receiving phase modulated signals communicated over a radio frequency (RF) channel comprising:

a data-assisted channel phase estimator that generates reliability-weighted channel symbol estimates to determine estimated channel phase; and a demodulator, responsive to the estimated channel phase that is based on the reliability-weighted channel symbol estimates, operative to demodulate a received phase modulated signal in a fashion that accounts for the estimated channel phase.

19. The receiver of claim 18 wherein the data-assisted channel phase estimator iteratively generates the reliability-weighted channel symbol estimates for a same channel symbol until a frame containing the same channel symbol is determined to pass a frame error threshold or until a predetermined number of iterations of channel phase estimates is detected.

20. The receiver of claim 18 including:

at least one antenna, operatively coupled to the data assisted channel phase estimator, that receives a pilot signal communicated over the RF channel and that receives a data signal; and wherein the data-assisted channel phase estimator includes at least one decoder operative to generate an estimate of an information sequence and the reliability-weighted channel symbol estimates based on the pilot signal or a data-assisted channel estimate.

21. The receiver of claim 20 wherein the at least one decoder uses a maximum a posteriori probability algorithm to generate at least the reliability-weighted channel symbol estimates.

22. The receiver of claim 21 wherein the digital RF channel communicates symbols as frames in a spread spectrum fashion and wherein the demodulator includes a pilot signal de-spreader and a data signal de-spreader.

23. The receiver of claim 22 wherein the data assisted channel phase estimator iteratively generates reliability-weighted channel symbol estimates on a per symbol basis.

24. The receiver of claim 22 wherein the data assisted channel phase estimator reprocesses symbols from a same frame that have been corrected based on reliability-weighted channel symbol estimates using additional channel phase estimations based on updated reliability-weighted channel symbol estimates.

25. A receiver for receiving phase modulated signals communicated over a radio frequency (RF) channel comprising:

at least one antenna operative to receive a pilot signal representing pilot symbols communicated over the RF channel and to receive a data signal communicated over the RE channel;

a data-assisted channel phase estimator, operatively responsive to demodulated pilot signal symbols and symbols from the data signal received by the at least one antenna, that iteratively generates an estimate of information and reliability-weighted channel symbol estimates to determine estimated channel phase wherein at least the reliability-weighted channel symbol estimates is iteratively generated for a same channel symbol until a frame containing the same channel symbol is determined to pass a frame error threshold or until a predetermined number of iterations of soft decoding is performed; and a demodulator operatively responsive to a channel phase estimate that is based on the reliability-weighted channel symbol estimates to demodulate a received phase modulated signal in a fashion that accounts for iteratively estimated channel phase.

26. The receiver of claim 25 including a decoder that uses a maximum a posteriori probability algorithm to generate at least the reliability-weighted channel symbol estimates.

27. The receiver of claim 25 wherein the data assisted channel phase estimator iteratively generates reliability-weighted channel symbol estimates on a per symbol basis.

28. The receiver of claim 25 wherein the data assisted channel phase estimator reprocesses symbols from a same frame that have been corrected based on reliability-weighted channel symbol estimates using additional channel phase estimations based on updated reliability-weighted channel symbol estimates.

29. The receiver of claim 28 including:

a first multiplier circuit, operatively coupled to receive the data signal and to receive the reliability-weighted channel symbol estimates, and operative to output channel phase estimates; and a second multiplier circuit, operatively coupled to the first multiplier circuit and to the data signal, having an output representing reliability data based phase compensated symbols.

* * * * *

UNITED STATES PATENT AND TRADEMARK OFFICE
CERTIFICATE OF CORRECTION

PATENT NO.    : 6,498,805 B1
DATED         : December 24, 2002
INVENTOR(S)   : Brown et al.

It is certified that error appears in the above-identified patent and that said Letters Patent is hereby corrected as shown below:

Column 8,
Line 26, reads "RE channel", should be -- RF channel --.

Signed and Sealed this

Eighteenth Day of March, 2003

JAMES E. ROGAN
*Director of the United States Patent and Trademark Office*